(12) United States Patent
Bensussan

(10) Patent No.: US 7,258,004 B2
(45) Date of Patent: Aug. 21, 2007

(54) VOLUME INDICATOR HAVING ANGLED GRADIENT OPENINGS

(75) Inventor: Bernard Bensussan, Monroe, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 73 days.

(21) Appl. No.: 11/182,397

(22) Filed: Jul. 15, 2005

(65) Prior Publication Data

US 2007/0012097 A1    Jan. 18, 2007

(51) Int. Cl.
G01F 23/04    (2006.01)

(52) U.S. Cl. .................................. 73/290 B; 33/729

(58) Field of Classification Search .............. 73/290 B; 33/722, 729
See application file for complete search history.

(56) References Cited

U.S. PATENT DOCUMENTS

| 5,548,865 | A | 8/1996 | Pagani | 15/262 |
| 5,918,343 | A | 7/1999 | Young | 15/262 |
| D426,361 | S | 6/2000 | Young | D32/53 |
| 6,283,170 | B1 | 9/2001 | Robinson | 141/1 |
| 6,810,731 | B1 * | 11/2004 | Lo | 73/290 R |
| 2002/0120997 | A1 | 9/2002 | Alt | 15/261 |

FOREIGN PATENT DOCUMENTS

DE    G 93 16 851.9    3/1994

* cited by examiner

Primary Examiner—Hezron Williams
Assistant Examiner—Paul M. West
(74) Attorney, Agent, or Firm—Ohlandt, Greeley, Ruggiero & Perle, L.L.P.

(57) ABSTRACT

A volume indicator for use with a container is provided. The indicator includes a body having a gradient opening defined therethrough at a predetermined angle. The gradient opening is associated with a predetermined volume or height of material in the container. The predetermined angle compensates for a line of sight angle of a user into the container.

20 Claims, 3 Drawing Sheets

US 7,258,004 B2

VOLUME INDICATOR HAVING ANGLED GRADIENT OPENINGS

BACKGROUND OF THE INVENTION

1. Field of the Invention

The present disclosure is related to a volume indicator. More particularly, the present disclosure is related to a volume indicator having angled gradient openings.

2. Description of Related Art

Many consumer and industrial chemicals, medicines, and others materials require measurement at the point of use. Other consumer and industrial chemicals, medicines, and others materials may require mixing and/or dilution with one or more other materials at the point of use. For example, many cleaning chemicals, such as soap, are provided in a concentrated form that requires dilution with a predetermined amount of water.

As such, many containers such as buckets, measuring cups, and others, have been provided with volume gradient markings molded or painted directly onto the container. Unfortunately, the molded markings can be difficult to see while filling the container and the painted markings can wear off over time. In some prior containers, the gradient markings have been molded onto the container, then the markings are painted to increase the visibility of the markings.

In addition, the line of sight of the user can effect the accuracy of the measurement using such prior art molded or painted markings. For example, the line of sight of the user can cause an inaccurate reading unless the container is clear and is viewed from the side in a plane parallel to the gradient markings.

Accordingly, there is a continuing desire for volume indicators that avoid mitigate and/or overcome one or more of the above and other deleterious effects of prior art volume indicators.

BRIEF SUMMARY OF THE INVENTION

It is an object of the present disclosure to provide a volume indicator having one or more gradient openings defined therethrough at a predetermined angle.

These and other objects and advantages of the present disclosure are provided by a volume indicator for use with a container. The indicator includes a body having a gradient opening defined therethrough at a predetermined angle. The gradient opening is associated with a predetermined volume or height of material in the container.

These and other objects and advantages of the present disclosure are also provided by a measuring system. The system includes a container for holding a material and a volume indicator disposed in the container. The volume indicator has a gradient opening defined therethrough at a predetermined angle. The gradient opening is associated with a predetermined volume or height of the material in the container.

The above-described and other features and advantages of the present disclosure will be appreciated and understood by those skilled in the art from the following detailed description, drawings, and appended claims.

DETAILED DESCRIPTION OF THE INVENTION

Figure 1:
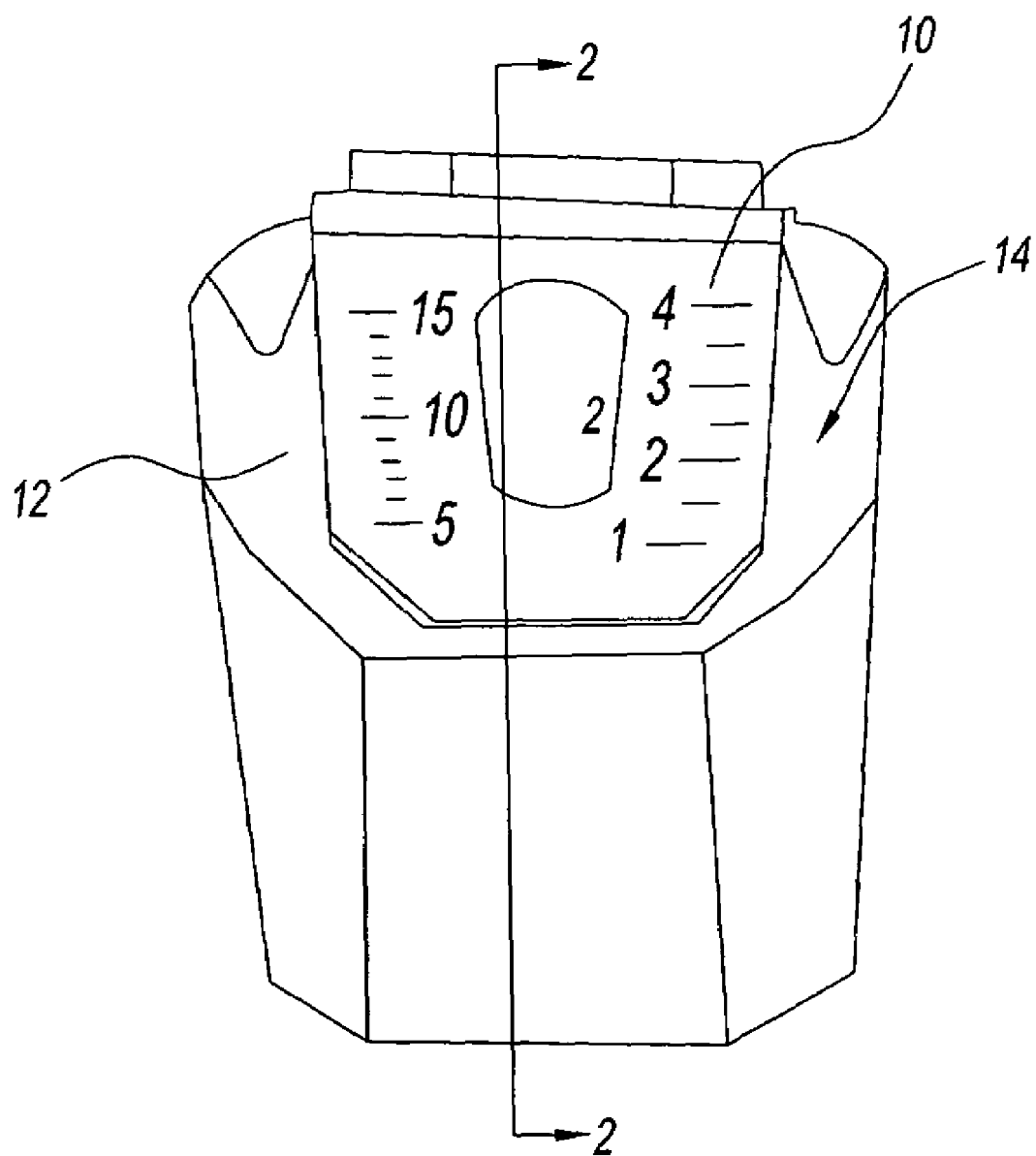
FIG. 1 is a top perspective view of a container in use with an exemplary embodiment of a volume indicator according to the present disclosure.
Figure 2:
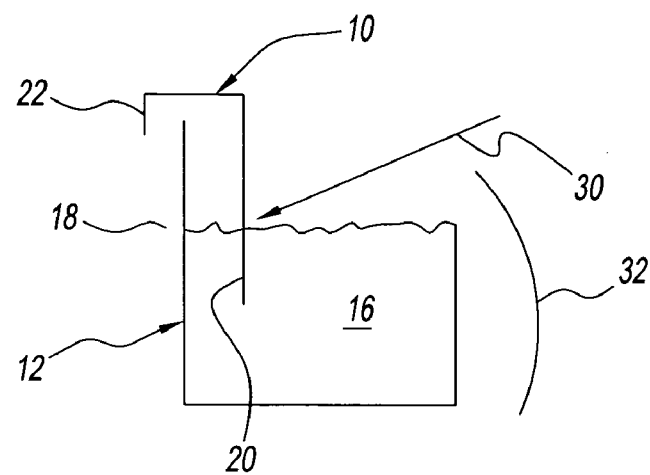
FIG. 2 is a sectional view of FIG. 1, taken along lines 2-2.
Figure 3:
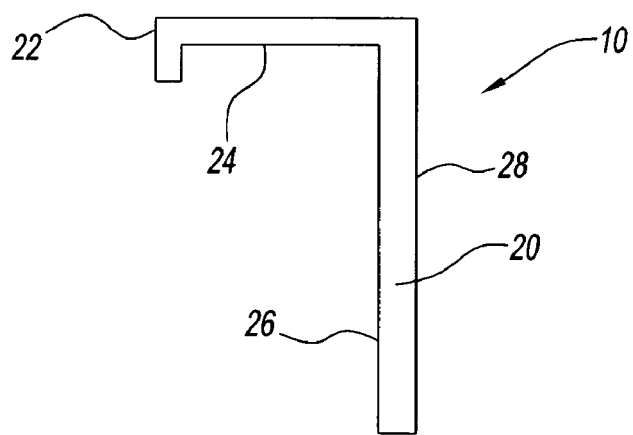
FIG. 3 is a side view of the volume indicator of FIG. 1.

Referring to the drawings and in particular to FIGS. 1 through 3, an exemplary embodiment of a volume indicator 10 according to the present disclosure is shown. Indicator 10 is described herein in use with a container 12. Container 12 defines a holding area 14 for holding a material 16, such as a predetermined volume of liquid, powder, or other material to be measured. Advantageously, indicator 10 allows the user to determine when area 14 has been filled with material 16 to a predetermined volume 18, where the predetermined volume is indicated by the height of material 16 in area 14.

Indicator 10 includes a body 20 and a connector 22. Connector 22 can selectively secure indicator 10 to container 12 so that body 20 is disposed within area 14. In the illustrated embodiment, connector 22 is shown as a hook member 24 for hooking indicator 10 over a side of container 12. Of course, it is contemplated by the present disclosure for connector 22 to be any connector capable of securing body 20 in area 14. Connector 22 can removably or permanently secure indicator to container 12.

Body 20 includes a back surface 26 and a front surface 28, which is opposite the back surface. In use, connector 22 secures body 20 in area 14 so that back surface 26 is proximate the wall of container 12 and front surface 28 is remote from the container wall. In this position, front surface 28 is viewable along a line of sight 30 from outside of container 12. Line of sight 30 typically forms a first angle 32 with respect to the surface on which container 12 is disposed.

Figure 4:
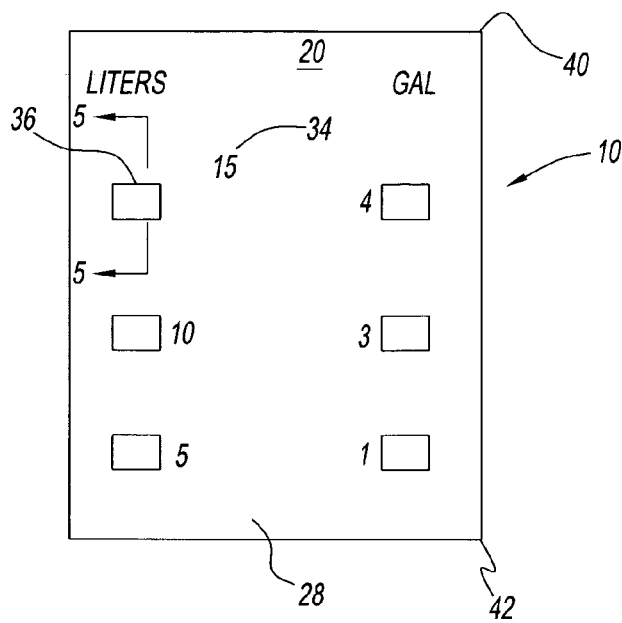
FIG. 4 is a front view of the volume indicator of FIG. 1.

Body 20 includes one or more volume or height gradient markings 34, best seen in FIG. 4. Indicator 10 and container 12 are calibrated to one another so that gradient markings 34 indicate to the user when area 14 contains the amount of material 16 indicated by the gradient marking.

Figure 5:
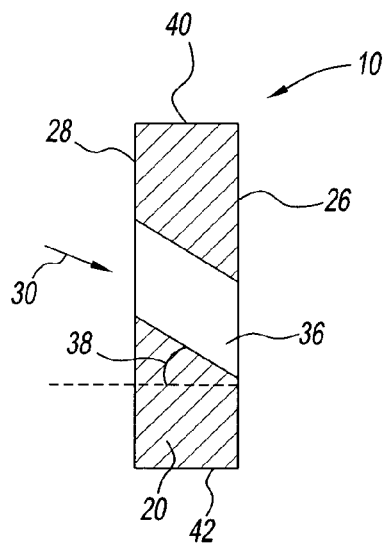
FIG. 5 is a sectional view of FIG. 4, taken along lines 5-5.

Advantageously, each gradient marking 34 is associated with a gradient opening 36. As seen in FIG. 5, each gradient opening 36 is defined through body 20 at a second angle 38. Openings 36 let the user see container 12 through indicator 10 along line of sight 30. Thus, gradient opening 36 compensates for the angle of the line of sight 30, which can increase the accuracy of measurement of indicator 10.

Figure 6:
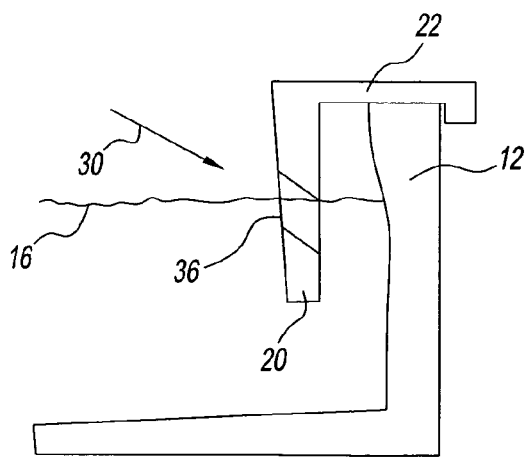
FIG. 6 is a view of the volume indicator of FIG. 1 during use.

During use of indicator 10, the indicator is placed in container 12 so that body 20 is in area 14 with front surface 28 viewable from outside of the container. Next, area 14 is filled with material 16 until the material fills opening 36 and, thus, blocks or at least partially blocks line of sight 30 to container 12 behind indicator 10 as seen in FIG. 6. Once material 16 until the material fills opening 36 and, thus, blocks or at least partially blocks line of sight 30 to container 12 behind indicator 10, area 14 has been filled to desired volume 18.

Markings 34 can be molded onto body 20, as raised protrusions, or can be painted onto the body as desired. In a preferred embodiment, markings 34 are also defined through body 20 at second angle 38. In another exemplary embodiment, openings 36 can function as markings 34.

To further increase the visibility of openings 36 and/or markings 34, indicator 10 can be made of a different color material than container 12. In this manner, the contrast of colors of indicator 10 and container 12 further increases the visibility of openings 36 and/or markings 34.

Figure 7:
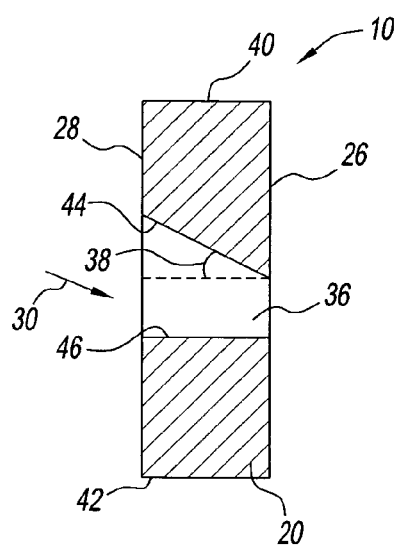
FIG. 7 is a section view of an alternate exemplary embodiment of the volume indicator of FIG. 5.

Referring now to FIG. 7, an alternate exemplary embodiment of gradient opening 36 is shown. Again, gradient opening 36 is defined through body 20 at a second angle 38. However in this embodiment, only an upper edge 44 of gradient opening 36 includes second angle 38, while a lower edge 46 of the gradient opening is substantially perpendicular to body 20. It has been found that indicator 10 having only upper edge 44 of gradient opening 36 at second angle 38 is easier to mold using a simple two part cavity and core.

As defined herein, the term "angle" shall mean an angle greater than zero and less than one hundred and eighty degrees, including all sub-ranges therebetween. As such, second angle 38 is neither perpendicular nor parallel to body 20.

Second angle 38 is preferably dependent on first angle 32. For example, second angle 38 is preferably substantially similar to first angle 32 so that indicator 10 compensates for the angle of line of sight 30. Specifically, second angle 38 is within between about ±30 percent of first angle 32, with between about ±15 percent being preferred.

In one exemplary embodiment, the second angle 38 of all gradient openings 36 in indicator 10 are substantially identical to one another. For example, container 12 can be a mop bucket placed on the floor. Here, second angle 38 for all of the openings 36 can be between about thirty to about sixty degrees, with about forty-five degrees being most preferred.

First angle 32 depends on the type of container, the use of the container, the height of the typical user of the container, and other variables. As such, first angle 32 may vary when viewing openings 36 at an upper portion 40 of body 20 as compared to viewing the openings at a lower portion 42 of the body. Thus, it is also contemplated by the present disclosure for second angle 38 to vary along body 20. For example, openings 36 proximate upper portion 40 of body 20 can have a smaller second angle 38 as compared to the openings proximate lower portion 42 of the body. This is more likely in the case where indicator 10 is relatively long such that the viewing angle 32 from a stationary point varies substantially from the upper portion 40 to the lower portion 42.

Indicator 10 can be molded without openings 36 and markings 34, which can be subsequently stamped through body 20 at second angle 38. Preferably, openings 36 and markings 34 are molded through body 20 at second angle 38 during the molding of indicator 10.

It has been determined that providing indicator 10 with openings 36 and markings 34 as angled openings through the indicator provides several advantages. For example, indicator 10 provides for more accurate volume measurements than molded or printed gradient markings as the indicator compensates for the viewing angle of the user. Further, indicator 10 is more ergonomic than prior measuring devices by reducing the bending or kneeling required by the user during the filling of container 12. In addition, indicator 10 can increase the safety of the user when adding chemicals to container 12 by allowing the user to remain a safe distance away from the container while filling, which can prevent splashing chemicals from contacting the face or eyes of the user.

Indicator 10 is illustrated having a substantially planar body 20 in use with container 12 having substantially planar walls. Of course, it is contemplated by the present disclosure for body 20 to be curved in one or more planes so that indicator 10 finds use with containers having cylindrical or conical walls.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A volume indicator for use with a container, comprising:
    a body having a gradient opening defined therethrough at a predetermined angle, said gradient opening being associated with a predetermined volume or height of material in the container, wherein said predetermined angle compensates for a line of sight angle to said gradient opening.

2. The volume indicator as in claim 1, further comprising a connector for securing said body in the container.

3. The volume indicator as in claim 1, wherein said predetermined angle is substantially similar to said line of sight angle.

4. The volume indicator as in claim 1, further comprising a gradient marking associated with said gradient opening, said gradient marking specifying said predetermined volume or height.

5. The volume indicator as in claim 4, wherein said gradient marking is defined through said body at said predetermined angle.

6. The volume indicator as in claim 1, wherein said gradient opening functions as a gradient marking to specifying said predetermined volume or height.

7. A volume indicator for use with a container, comprising:
    a body having a gradient opening defined therethrough at a predetermined angle, said gradient opening being associated with a predetermined volume or height of material in the container, wherein said gradient opening comprises an upper edge and a lower edge, said upper edge having said predetermined angle and said lower edge being substantially perpendicular to said body.

8. A measuring system comprising:
    a container for holding a material; and
    a volume indicator disposed in said container, said volume indicator having a gradient opening defined therethrough at a predetermined angle, said gradient opening being associated with a predetermined volume or height of said material in said container, wherein said predetermined angle compensates for a line of sight angle to said gradient opening.

9. The measuring system as in claim 8, wherein said predetermined angle is substantially similar to said line of sight angle.

10. The measuring system as in claim 8, further comprising a connector securing said volume indicator to said container.

11. The measuring system as in claim 8, wherein said container and said volume indicator are different colors.

12. The measuring system as in claim 8, further comprising a gradient marking associated with said gradient opening, said gradient marking specifying said predetermined volume or height.

13. The measuring system as in claim 12, wherein said gradient marking is defined through said volume indicator at said predetermined angle.

14. The measuring system as in claim 8, wherein said gradient opening functions as a gradient marking to specifying said predetermined volume or height.

15. The measuring system as in claim 8, further comprising a plurality of gradient openings defined through said volume indicator, each of said plurality of gradient openings are associated with a different predetermined volume or height of said material in said container.

16. The measuring system as in claim 15, wherein all of said plurality of gradient openings are defined through said volume indicator at substantially the same predetermined angle.

17. The measuring system as in claim 8, wherein said gradient opening comprises an upper edge having said predetermined angle.

18. A measuring system comprising:
 a container for holding a material; and
 a volume indicator disposed in said container, said volume indicator having a plurality of gradient openings defined therethrough at a predetermined angle, each of said plurality of gradient openings are associated with a different predetermined volume or height of said material in said container, wherein each of said plurality of gradient openings is defined through said volume indicator at a different predetermined angle.

19. A volume indicator for use with a container, comprising:
 a body disposable in the container; and
 a plurality of gradient openings defined through said body, each of said plurality of gradient openings having an upper edge and a lower edge, said upper edge of each of said plurality of gradient openings being defined through said body at a different predetermined angle, and said lower edge being defined through said body substantially perpendicular to said body.

20. The volume indicator as in claim 19, wherein each of said predetermined angles compensates for a line of sight angle to a respective one of said plurality of gradient openings.

* * * * *